(12) United States Patent
Natori et al.

(10) Patent No.: US 12,184,446 B2
(45) Date of Patent: Dec. 31, 2024

(54) RELAY DEVICE, COMMUNICATION NETWORK SYSTEM, AND COMMUNICATION CONTROL METHOD

(71) Applicant: Nissan Motor Co., Ltd., Kanagawa (JP)

(72) Inventors: Kiyoshi Natori, Kanagawa (JP); Takashi Matsumoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/633,053

(22) PCT Filed: Oct. 19, 2020

(86) PCT No.: PCT/JP2020/039304
§ 371 (c)(1),
(2) Date: Feb. 4, 2022

(87) PCT Pub. No.: WO2022/085057
PCT Pub. Date: Apr. 28, 2022

(65) Prior Publication Data
US 2023/0327907 A1 Oct. 12, 2023

(51) Int. Cl.
*H04L 12/40* (2006.01)

(52) U.S. Cl.
CPC ............ *H04L 12/40006* (2013.01); *H04L 2012/40215* (2013.01); *H04L 2012/40273* (2013.01)

(58) Field of Classification Search
CPC ..... H04L 12/40006; H04L 2012/40215; H04L 2012/40273
See application file for complete search history.

(56) References Cited

U.S. PATENT DOCUMENTS

| 2005/0262419 A1* | 11/2005 | Becker | H04H 20/95 714/758 |
| 2012/0327954 A1* | 12/2012 | Iourtchenko | H04L 65/70 370/474 |

(Continued)

FOREIGN PATENT DOCUMENTS

| CN | 108370342 A | 8/2018 |
| CN | 111478836 A | 7/2020 |
| WO | 2017/203902 A1 | 11/2017 |

OTHER PUBLICATIONS

Office Action issued in the Chinese Application No. 202080053939. 8, mailed Oct. 19, 2023 (8 pages).

(Continued)

*Primary Examiner* — Henry Tsai
*Assistant Examiner* — Harry Z Wang
(74) *Attorney, Agent, or Firm* — Osha Bergman Watanabe & Burton LLP (57) ABSTRACT

A relay device includes a relay connected between a first communication network and a second communication network. The second communication network uses a communication protocol different from the first communication network. A first frame is transmitted in the first communication network, and has a first payload including control information, a first data ID for identifying the control information, and a data length code indicating a data length of the first payload. A second frame is transmitted in the second communication network, and has the first frame, a second data ID indicating that the first frame is included, and unique data stored in a predetermined storage area at a position behind the first frame. The relay recognizes the first frame without performing a frame recognition process on (Continued)

the data in the predetermined storage area when recognizing the first frame in the second frame on a basis of the data length code.

4 Claims, 8 Drawing Sheets

(56) References Cited

U.S. PATENT DOCUMENTS

| | | |
|---|---|---|
| 2014/0059250 A1* | 2/2014 | Suzuki .................... H04L 12/40 709/253 |
| 2015/0089236 A1* | 3/2015 | Han ...................... H04L 9/3271 713/168 |
| 2016/0112215 A1* | 4/2016 | Lee ........................ H04L 12/46 370/235 |
| 2017/0109521 A1 | 4/2017 | Ujiie et al. |
| 2018/0167360 A1 | 6/2018 | Maeda et al. |
| 2019/0058613 A1* | 2/2019 | Maeda ............... H04L 12/4625 |
| 2019/0068407 A1* | 2/2019 | Haga ...................... H04L 12/66 |
| 2019/0109716 A1* | 4/2019 | Mizoguchi ........... H04L 9/3242 |
| 2020/0351123 A1 | 11/2020 | Haga et al. |
| 2021/0365542 A1 | 11/2021 | Ujiie et al. |

OTHER PUBLICATIONS

Extended European Search Report issued in European Application No. 20945715.9, mailed on Oct. 16, 2023 (10 pages).

* cited by examiner

RELAY DEVICE, COMMUNICATION NETWORK SYSTEM, AND COMMUNICATION CONTROL METHOD

TECHNICAL FIELD

The present invention relates to a relay device, a communication network system, and a communication control method for communicating data via a communication network.

BACKGROUND ART

Patent Document 1 discloses an in-vehicle network system including a plurality of ECUs (Electronic Control Units) that control in-vehicle devices, an in-vehicle network such as CAN (Controller Area Network) that connects the ECUs so that they can communicate with each other, and a gateway device that relays communication between the ECUs. This gateway device stores, in the payload of an Ethernet (registered trademark) data frame, a plurality of CAN data frames to transmit data frames from the ECUs connected to a CAN to the ECUs connected to an Ethernet using a communication protocol different from the CAN.

PRIOR ART DOCUMENT

Patent Document

[Patent Document 1] International Publication No. 2017/203902

SUMMARY OF THE INVENTION

Problem to be Solved by the Invention

In the in-vehicle network system described in Patent Document 1, each of the plurality of CAN data frames stored in the payload includes a DLC indicating the length of the data. The gateway device receives the Ethernet data frame and identifies the delimiters of the plurality of CAN data frames from the DLC in the payload of the Ethernet data frame to recognize each of the CAN data frames. However, there is a possibility that data arranged on the tail side in the Ethernet data frame may be erroneously recognized as a CAN data frame.

In order to solve the problem, the present invention provides a relay device, a communication network system, and a communication control method for preventing a frame from failing to be recognized when data is communicated between communication networks using different communication protocols.

Means for Solving Problem

The present invention solves the above problem by a second frame having a first frame, a first data ID, and unique data stored in a predetermined storage area at a position behind the first frame, and by a relay configured to recognize the first frame without performing a frame recognition process on the data in the storage area when performing a frame recognition process for recognizing the first frame in the second frame on a basis of a data length of a payload of the first frame.

Effect of the Invention

According to the present invention, it is possible to prevent a frame from failing to be recognized.

MODE(S) FOR CARRYING OUT THE INVENTION

An embodiment of the present invention will be described below with reference to the drawings. In the present embodiment, a relay device, a communication network system, and a communication control method according to the present invention will be described with reference to an example in which the relay device, the communication network system, and the communication control method are applied to an in-vehicle network system installed in an automobile (also referred to as a vehicle). An in-vehicle communication network system CNW according to the present embodiment is a network system in which a plurality of communication networks using different communication protocols such as CAN, CAN FD, and Ethernet are mixed. CAN FD is a communication protocol that is upward compatible with CAN, and provides a larger amount of data communication per unit time (communication speed) than that of CAN. Ethernet is a communication network used for LAN (Local Area Network) and the like, and provides a larger amount of data communication per unit time than that of CAN FD.

Figure 1:
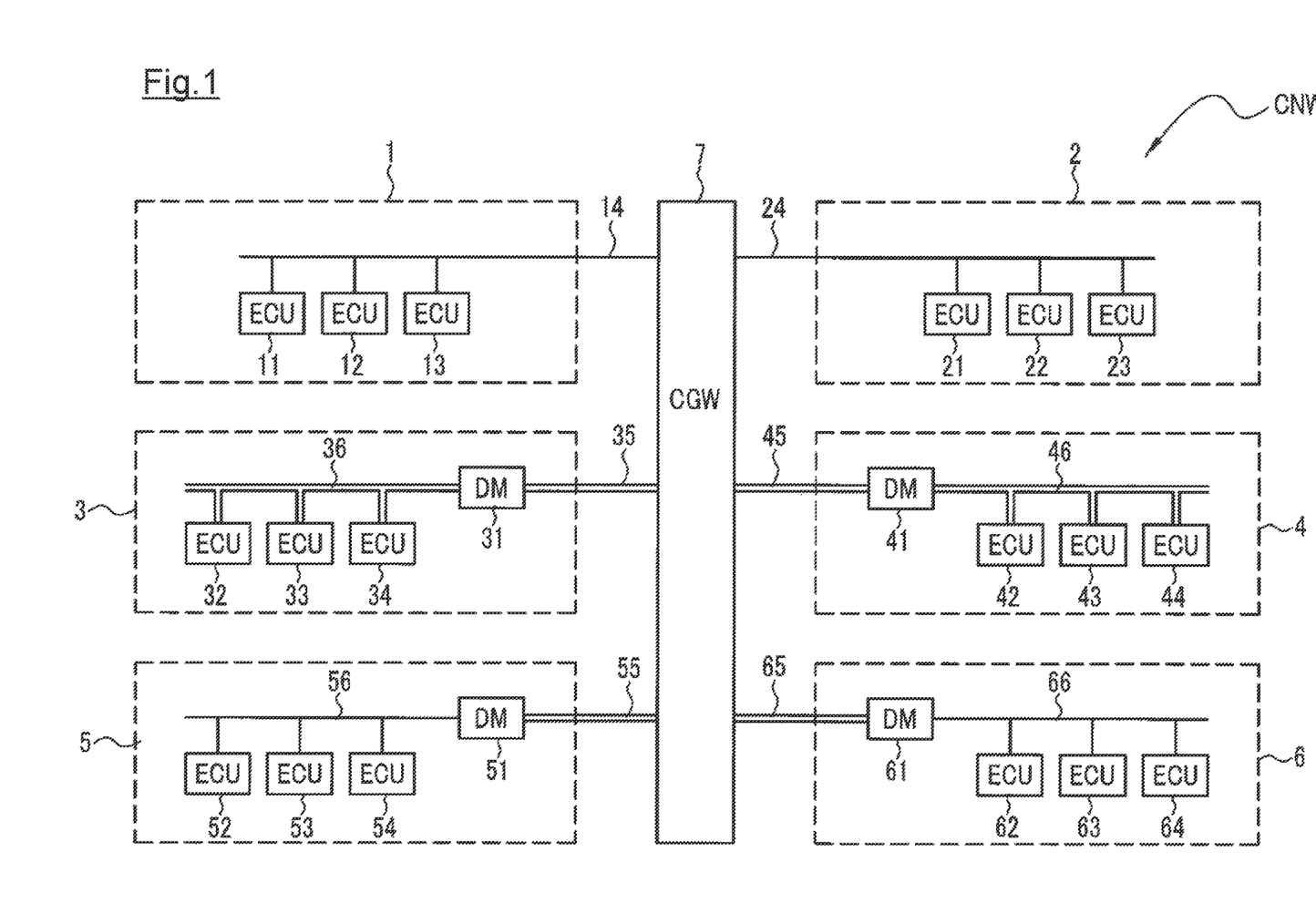
FIG. 1 is a configuration diagram of an in-vehicle communication network system to which a relay device, a communication network system, and a communication control method according to the present invention are applied.

FIG. 1 is a block diagram illustrating a configuration of the in-vehicle communication network system CNW according to the present embodiment. The in-vehicle communication network system CNW includes a first communication network 1, a second communication network 2, a third communication network 3, a fourth communication network 4, a fifth communication network 5, a sixth communication network 6, and a CGW (Central Gateway) 7 connected to the first communication network 1 to the sixth communication network 6. The first communication network 1 to the sixth communication network 6 constitute a plurality of control groups corresponding to basic configurations into which the configuration of the vehicle is divided. Each control group is also referred to as a domain.

Examples of domains include, as well as a multimedia domain for controlling information presentation in the vehicle, a power train domain for controlling the engine and the like, a chassis domain for controlling the steering mechanism and the like, a body domain for controlling the power window and the like, and an ADAS (Advanced Driver-Assistance System) domain for performing autonomous driving control. Some of the first communication network 1 to the sixth communication network 6 correspond to examples of a first communication network and a second communication network of the present invention. Note that the number of communication networks constituting the in-vehicle communication network system CNW is not limited to six.

The first communication network 1 includes an ECU 11, an ECU 12, and an ECU 13. The ECUs 11 to 13 are connected to the CGW 7 via a CAN bus 14 through which data communication is performed according to the CAN communication protocol. The ECUs 11 to 13 are electric control units that control in-vehicle devices installed in the vehicle. Although not illustrated in detail, the ECUs 11 to 13 each include a controller and a communication circuit. The controller includes a CPU, a ROM in which a control program executed by the CPU is stored, a RAM used as a work area for the control program, and the like. The controller functions as the ECU by the CPU executing the control program. The communication circuit is controlled by the controller to communicate between the controller and the CAN bus 14.

To the ECUs 11 to 13, the in-vehicle devices such as sensors or actuators (not illustrated) are connected. The ECUs 11 to 13 each acquire, from a sensor connected thereto, sensor information indicating the detection result from the sensor, and generates a CAN data frame (hereinafter, also referred to as a CAN frame and corresponding to a "first frame" of the present invention) storing control information including the acquired sensor information. The CAN frames generated by the ECUs 11 to 13 are transmitted to the CGW 7 via the CAN bus 14. Further, each of the ECUs 11 to 13 receives a CAN frame from the CGW 7 via the CAN bus 14, and controls the in-vehicle device such as an actuator on the basis of the control information stored in the received CAN frame. Some of the ECUs 11 to 13 correspond to examples of a first electric control unit and a second electric control unit of the present invention.

The second communication network 2 includes an ECU 21, an ECU 22, and an ECU 23. The ECUs 21 to 23 are connected to the CGW 7 via a CAN bus 24 through which data communication is performed according to the CAN communication protocol. Note that the ECUs 21 to 23 and the CAN bus 24 of the second communication network 2 have the same configurations as the ECUs 11 to 13 and the CAN bus 14 of the first communication network 1, and thus detailed description thereof will be omitted.

The third communication network 3 includes a DM (Domain Master) 31 and an ECU 32, an ECU 33, and an ECU 34. The DM 31 is connected to the CGW 7 via an FD bus 35 through which data communication is performed according to the CAN FD communication protocol. Further, the ECUs 32 to 34 are connected to the DM 31 via an FD bus 36 through which data communication is performed according to the CAN FD communication protocol.

The ECUs 32 to 34 are electric control units that control the in-vehicle devices installed in the vehicle, as with the ECUs 11 to 13 of the first communication network 1, and each include a controller and a communication circuit. The ECUs 32 to 34 each acquire, from a sensor connected thereto, sensor information indicating the detection result from the sensor, and generates a CAN FD data frame (hereinafter, also referred to as an FD frame and corresponding to a "second frame" of the present invention) storing control information including the acquired sensor information. The FD frames generated by the ECUs 32 to 34 are transmitted to the DM 31 via the FD bus 36. Further, each of the ECUs 32 to 34 receives an FD frame from the DM 31 via the FD bus 36, and controls the in-vehicle device such as an actuator on the basis of the control information stored in the received FD frame. Some of the ECUs 32 to 34 correspond to examples of the first electric control unit and the second electric control unit of the present invention.

The DM 31 is a relay that relays communication between the CGW 7 and the ECUs 32 to 34, and includes a controller and a communication circuit, as with the ECU. The DM 31 communicates the FD frame(s) with the ECUs 32 to 34 via the FD bus 36. Further, the DM 31 communicates the FD frame(s) with the CGW 7 via the FD bus 35. The DM 31 corresponds to an example of the relay according to the present invention.

The fourth communication network 4 includes a DM 41, an ECU 42, an ECU 43, and an ECU 44. The DM 41 is connected to the CGW 7 via an FD bus 45 through which data communication is performed according to the CAN FD communication protocol. Further, the ECUs 42 to 44 are connected to the DM 41 via an FD bus 46 through which data communication is performed according to the CAN FD communication protocol. Note that the DM 41, the ECUs 42 to 44, and the FD buses 45 and 46 of the fourth communication network 4 have the same configurations as the DM 31, the ECUs 32 to 34, and the FD buses 35 and 36 of the third communication network 3, and thus detailed description thereof will be omitted.

The fifth communication network 5 includes a DM 51, an ECU 52, an ECU 53, and an ECU 54. The DM 51 is connected to the CGW 7 via an FD bus 55 through which data communication is performed according to the CAN FD communication protocol. Further, the ECUs 52 to 54 are connected to the DM 51 via a CAN bus 56 through which data communication is performed according to the CAN communication protocol.

The ECUs 52 to 54 are electric control units that control the in-vehicle devices installed in the vehicle, as with the ECUs 11 to 13 of the first communication network 1, and each include a controller and a communication circuit. Each of the ECUs 52 to 54 acquires, from a sensor connected thereto, sensor information indicating the detection result from the sensor, and generates a CAN frame storing control information including the acquired sensor information. The CAN frames generated by the ECUs 52 to 54 are transmitted to the DM 51 via the CAN bus 56. Further, each of the ECUs 52 to 54 receives a CAN frame from the DM 51 via the CAN bus 56, and controls the in-vehicle device such as an actuator on the basis of the control information stored in the received CAN frame. Some of the ECUs 52 to 54 correspond to examples of the first electric control unit and the second electric control unit of the present invention.

The DM 51 is a relay that relays communication between the CGW 7 and the ECUs 52 to 54, and includes a controller and a communication circuit, as with the DM 31 of the third communication network 3. The DM 51 communicates the CAN frames with the ECUs 52 to 54 via the CAN bus 56. Further, the DM 51 communicates the FD frame with the CGW 7 via the FD bus 55. When transmitting the CAN frames generated by the ECUs 52 to 54 to the first communication network 1 or the second communication network 2, the DM 51 transmits the FD frame to the CGW 7, storing at least one of the CAN frames therein. The DM 51 corresponds to an example of the relay according to the present invention.

The sixth communication network 6 includes a DM 61, an ECU 62, an ECU 63, and an ECU 64. The DM 61 is connected to the CGW 7 via an FD bus 65 through which data communication is performed according to the CAN FD communication protocol. Further, the ECUs 62 to 64 are connected to the DM 61 via a CAN bus 66 through which data communication is performed according to the CAN communication protocol. Note that the DM 61, the ECUs 62 to 64, the FD bus 65, and the CAN bus 66 of the sixth communication network 6 have the same configurations as the DM 51, the ECUs 52 to 54, the FD bus 55, and the CAN bus 56 of the fifth communication network 5, and thus detailed description thereof will be omitted.

The CGW 7 is a relay that relays data frames between the first to sixth communication networks 1 to 6, and includes a controller and a communication circuit, as with the DM 31 and the like. The CGW 7 communicates the CAN frames with the ECUs 11 to 13 via the CAN bus 14 of the first communication network 1. Further, the CGW 7 communicates the CAN frames with the ECUs 21 to 23 via the CAN bus 24 of the second communication network 2. The CGW 7 communicates the FD frame with the DM 31 via the FD bus of the third communication network 3. Further, the CGW 7 communicates the FD frame with the DM 41 via the FD bus of the fourth communication network 4. Further, the CGW 7 communicates the FD frame with the DM 51 via the FD bus 55 of the fifth communication network 5. The CGW 7 communicates the FD frame with the DM 61 via the FD bus 65 of the sixth communication network 6. In response to receiving from the DM 51 or 61 the FD frame storing the CAN frame(s), the CGW 7 acquires the CAN frame(s) from the FD frame, and transmits the acquired CAN frame(s) to the ECUs 11 to 13 of the first communication network 1 or the ECUs 21 to 23 of the second communication network 2.

Figure 2:
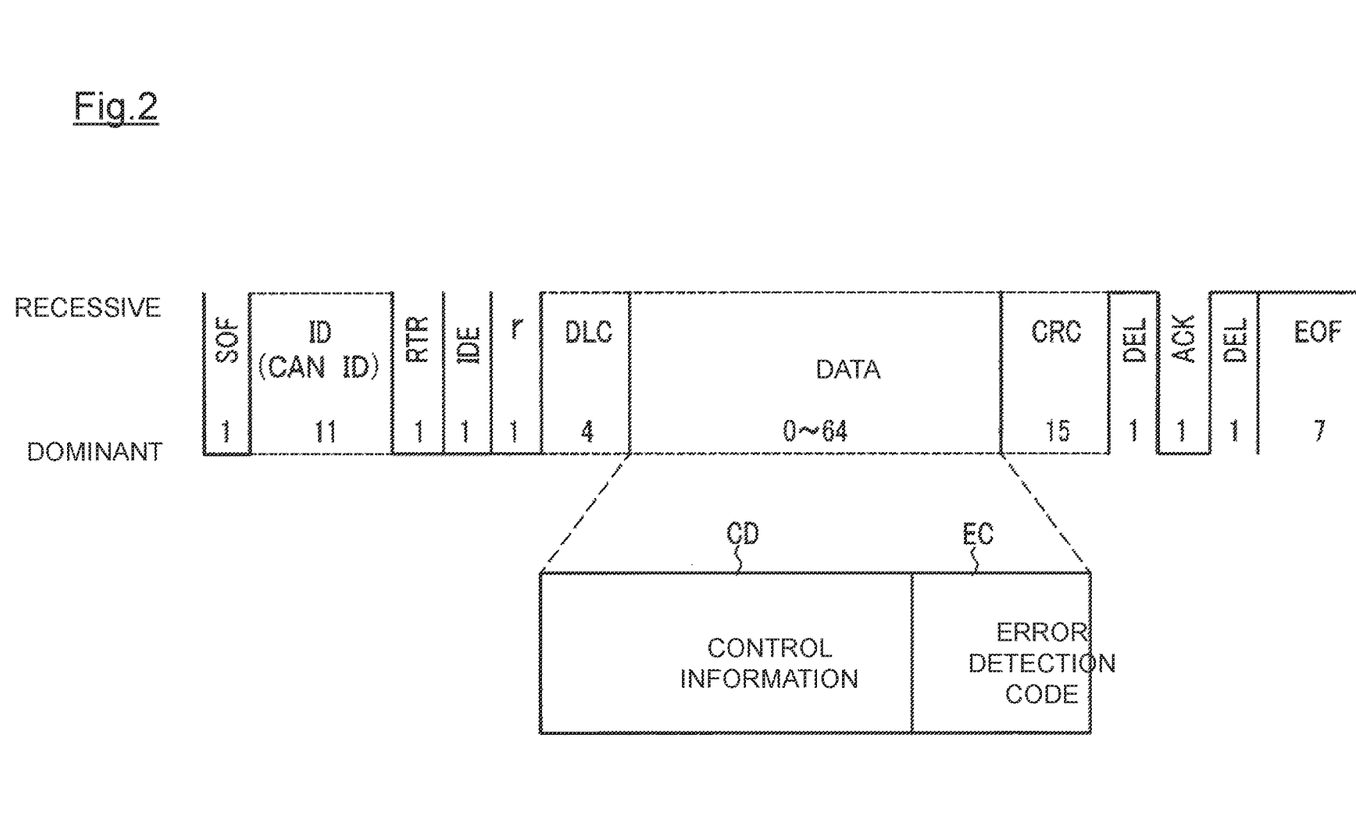
FIG. 2 is an explanatory diagram illustrating a structure of a CAN data frame.

Next, the structure of the CAN frame will be described. As illustrated in FIG. 2, the CAN frame includes an SOF (Start Of Frame) field, an ID (Identifier) field, an RTR (Remote Transmission Request) field, a DLC (Data Length Code) field, a data field, a CRC field, an ACK field, an EOF (End of Frame) field, and so on. The numerical value described in each field of FIG. 2 indicates the number of bits for each of the fields.

The SOF field indicates the beginning of the CAN frame. In the ID field, a CAN ID, which is an identifier indicating the type of data stored in the data field, is stored. The CAN ID is also referred to as a message ID. Note that, in CAN, when a plurality of ECUs start transmitting CAN frames at the same time, communication arbitration that prioritizes communication of a CAN frame having a smaller value of CAN ID is performed. In the DLC field, information indicating the size of the data (data length) in the subsequent data field is stored. In the CRC field, a cyclic redundancy check code used for detecting a communication error of the CAN frame is stored.

The specifications of the data to be stored in the data field are not specified in the CAN communication protocol. In the in-vehicle communication network system CNW according to the present embodiment, control information CD including sensor information acquired from the sensor connected to the ECU are stored in the data field. Note that the information included in the control information CD is not limited to the sensor information, and may be, for example, operation information requested by the driver. That data field may include not only the control information CD but also an error detection code EC calculated on the basis of the CAN ID and the control information CD by each ECU that generates the CAN frame.

Figure 3:
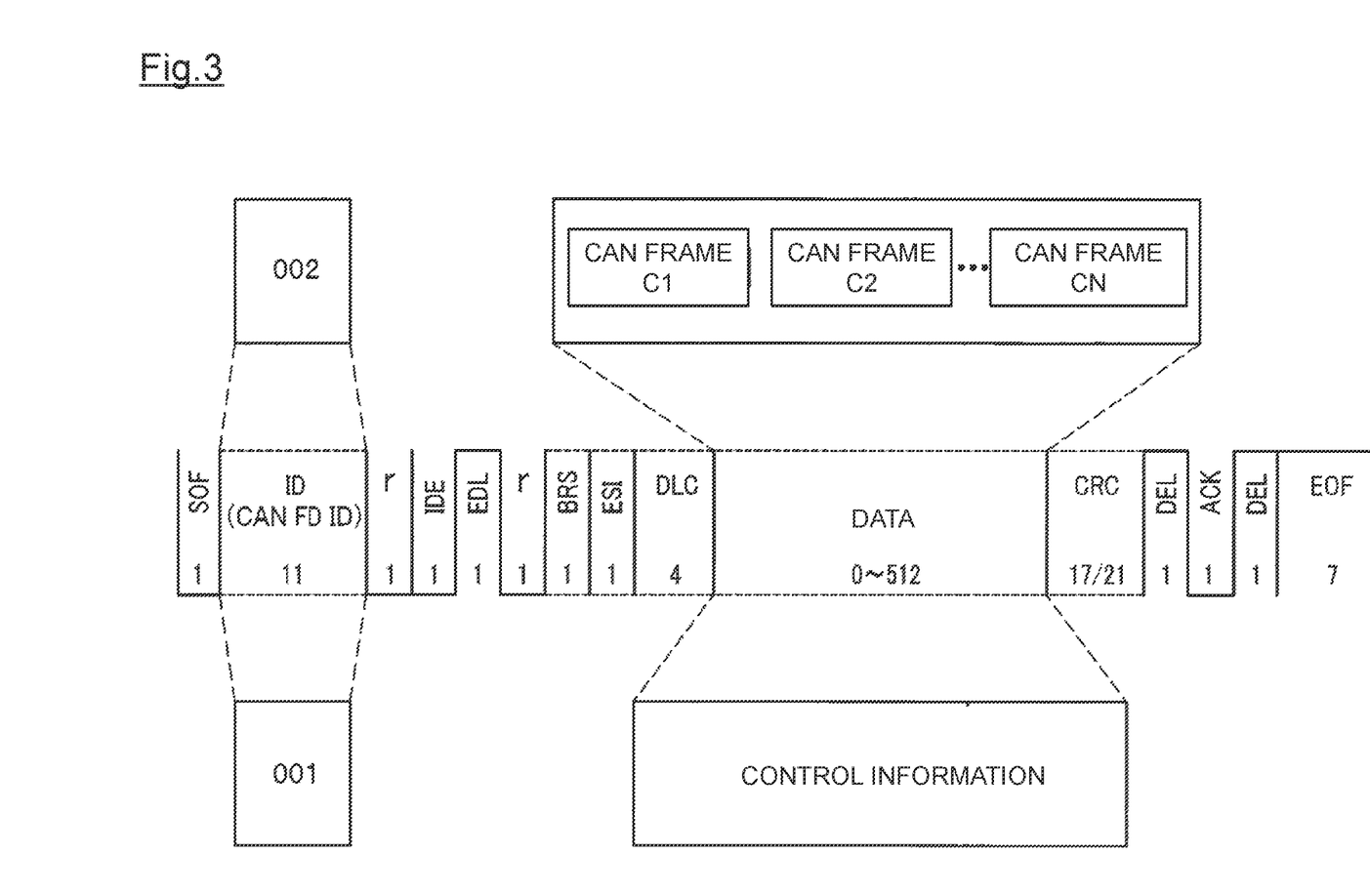
FIG. 3 is an explanatory diagram illustrating a structure of a CAN FD data frame.

Next, the structure of the FD frame will be described. As illustrated in FIG. 3, the FD frame includes an SOF field, an ID field, an EDL (Extended Data Length) field, a BRS (Bit Rate Switch) field, an ESI (Error State Indicator) field, a DLC field, a data field, a CRC field, an ACK field, an EOF field, and so on. The numerical value described in each field of FIG. 3 indicates the number of bits for each of the fields. In the FD frame, an EDL bit, a BRS bit, and an ESI bit are included in addition to the CAN frame, and also the data field is extended to 64 bytes. Further, in the ID field, a CAN FD ID, which is an identifier indicating the type of data stored in the data field, is stored. The CAN FD ID corresponds to a "second data ID" of the present invention.

When the FD frame is communicated between the ECUs connected to the FD bus, for example, the control information is stored in the data field, as with the CAN frame. Specifically, for example, when the FD frames are generated by the ECUs 32 to 34 connected to the FD bus 36 of the third communication network 3 and then transmitted to the ECUs 42 to 44 connected to the FD bus 46 of the fourth communication network 4, the control information is stored in the data field of the FD frame, as with the CAN frame. In this case, an ID indicating the type of control information, for example, "001" is assigned as the CAN FD ID.

Further, when the FD frame is transmitted from the ECU connected to the CAN bus to the ECUs via the FD bus, at least one CAN frame is stored in the data field. Specifically, for example, when the CAN frames are generated by the ECUs 11 to 13 connected to the CAN bus 14 of the first communication network 1 and then transmitted to the ECUs 52 to 54 of the fifth communication network 5, the CGW 7 stores at least one CAN frame in the data field of the FD frame and then transmits the CAN frame to the DM 51. In this case, an ID indicating that the CAN frame is stored in the data frame, for example, "002" is assigned as the CAN FD ID.

Figure 4:
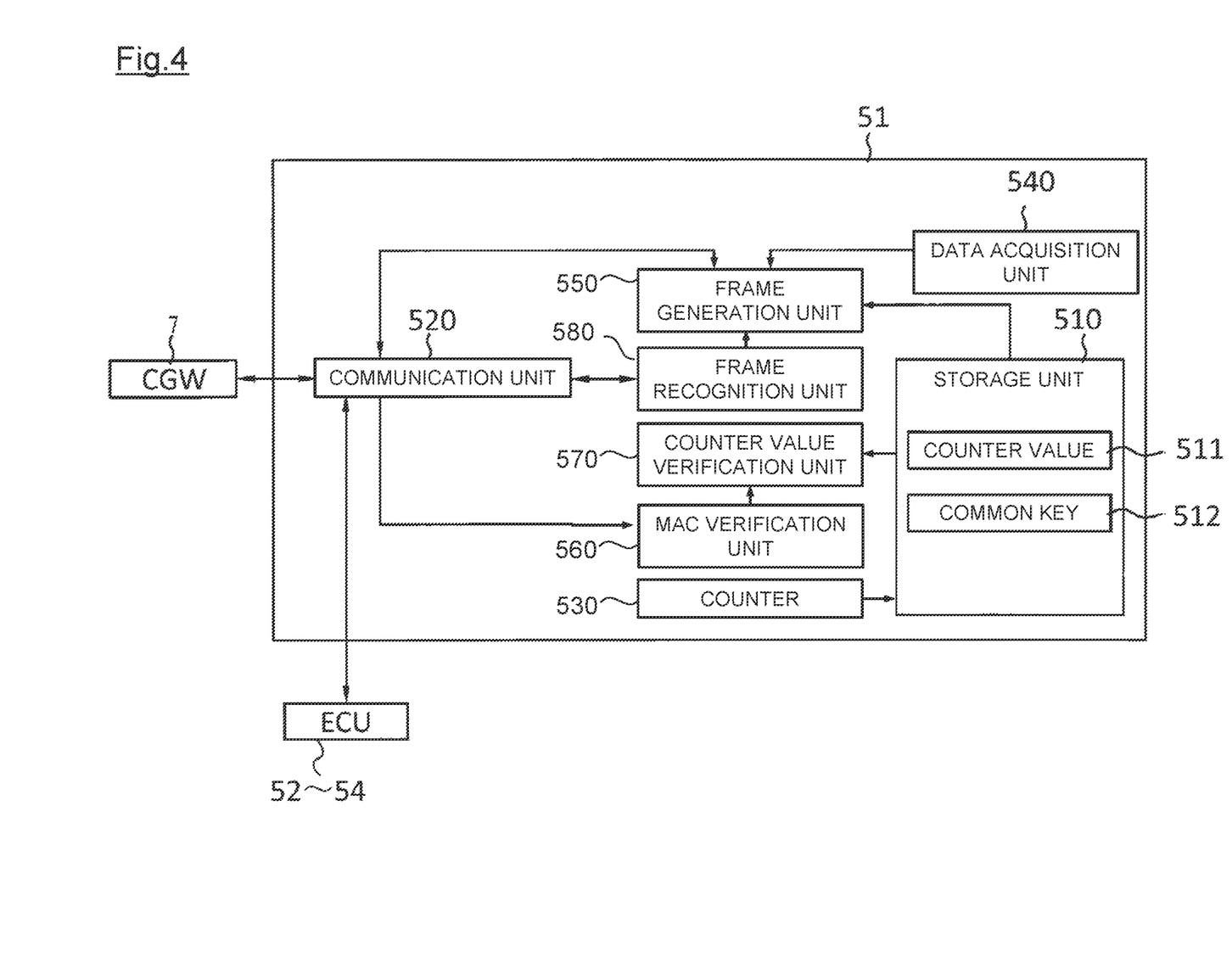
FIG. 4 is a configuration diagram of a DM.

Next, various functional units for generating an FD frame in the DM 51 will be described with reference to FIG. 4. FIG. 4 illustrates various functional units configured by a CPU of the DM 51 executing a control program. The DM 51 includes a storage unit 510, a communication unit 520, a counter 530, a data acquisition unit 540, a frame generation unit 550, a MAC verification unit 560, a counter value verification unit 570, and a frame recognition unit 580. Note that, although not described in detail, the other DMs 31, 41, and 61 have the same configuration, and the CGW 7 has the same basic configuration as the DM 51.

The storage unit 510 includes a memory such as a ROM, and stores a counter value 511 and a common key 512 which are used for dealing with a replay attack against the in-vehicle network system. Here, the replay attack will be described. Since the CGW 7 is connected to an external device in a communicable state, the in-vehicle communication network system CNW according to the present embodiment verifies the validity of the data frame by using a message authentication code (hereinafter referred to as "MAC") in order to deal with a replay attack from the outside. A replay attack is a cyber attack that causes an illegal operation on a device in a network by eavesdropping on data frames flowing on the network, storing their contents, and transmitting the stored data frames or modified data frames over the network. The replay attack is performed by an external device connected to the CGW 7 via the network.

The communication unit 520 communicates with the other ECUs and/or the other DMs or the like via the CAN and the CGW 7. When receiving a data frame transmitted from the CGW 7, the communication unit 520 identifies the ID of the data frame, and receives only a data frame having a predetermined ID, that is, a data frame associated with the DM 51 provided with the communication unit 520. Further, the communication unit 520 receives the data frames transmitted by the ECUs 52 to 54. Further, the communication unit 520 transmits a data frame generated by the frame generation unit 550 to the ECUs 52 to 54 or the CGW 7.

The counter 530 counts the number of times the data frame is transmitted to the CAN and increments the counter value. The counter value is a value for ensuring the continuity of the transmitted and received data (messages), and is used for verifying the validity of the data to discard spoofed data or falsified data from a third party. The counter 530 counts the number of times the data frame is transmitted by the ECU 11 and the others, the DM 31 and the others, and the CGW 7 in the in-vehicle network system. Accordingly, the counter of the ECU 11 and the others, the DM 31 and the others, and the CGW 7 have the same counter value. The counter value counted by the counter 530 is stored in the storage unit 510.

The data acquisition unit 540 acquires information from an in-vehicle device such as a sensor connected to the DM 51. The frame generation unit 550 generates control information including the information acquired by the data acquisition unit 540, and generates a data frame transmitted by the communication unit 520 on the basis of the generated control information. Specifically, the frame generation unit 550 sets an ID according to the type of the information acquired by the data acquisition unit 540. The frame generation unit 550 stores, for example, a table in which sensor information and CAN FD IDs are associated with each other in advance, and sets a CAN FD ID on the basis of this table. Note that, in order for the DM 31 or the others or the ECU 11 or the others to generate a CAN frame, an ID for the CAN frame is assigned.

Further, when the DM 51 transmits an FD frame storing at least one CAN frame from the ECUs 52 to 54 to the CGW 7 via the FD bus 55, the frame generation unit 550 stores, in the data field of the FD frame, the CAN frames received from the ECUs 52 to 54 by the communication unit 520, and assigns to the FD frame a CAN FD ID indicating that the CAN frames are included in the data field.

Further, in order to deal with the above-mentioned replay attack, the frame generation unit 550 generates a MAC with the common key 512 stored in the storage unit 510 on the basis of the CAN FD ID, the data included in the CAN FD data field, and the counter value 511 stored in the storage unit 510. The common key 512 to be used is common among the ECU 11 and the others, the DM 31 and the others, and the CGW 7. Further, for the calculation of the MAC, a method using a hash function (HMAC), a method using a block cipher algorithm (CMAC, etc.), or the like is used. The frame generation unit 550 generates a data frame on the basis of the set CAN FD ID, the control information including the information acquired by the data acquisition unit 540 and/or the data frame received by the communication unit 520, the counter value 511 stored in the storage unit 510, and the generated MAC.

Figure 5:
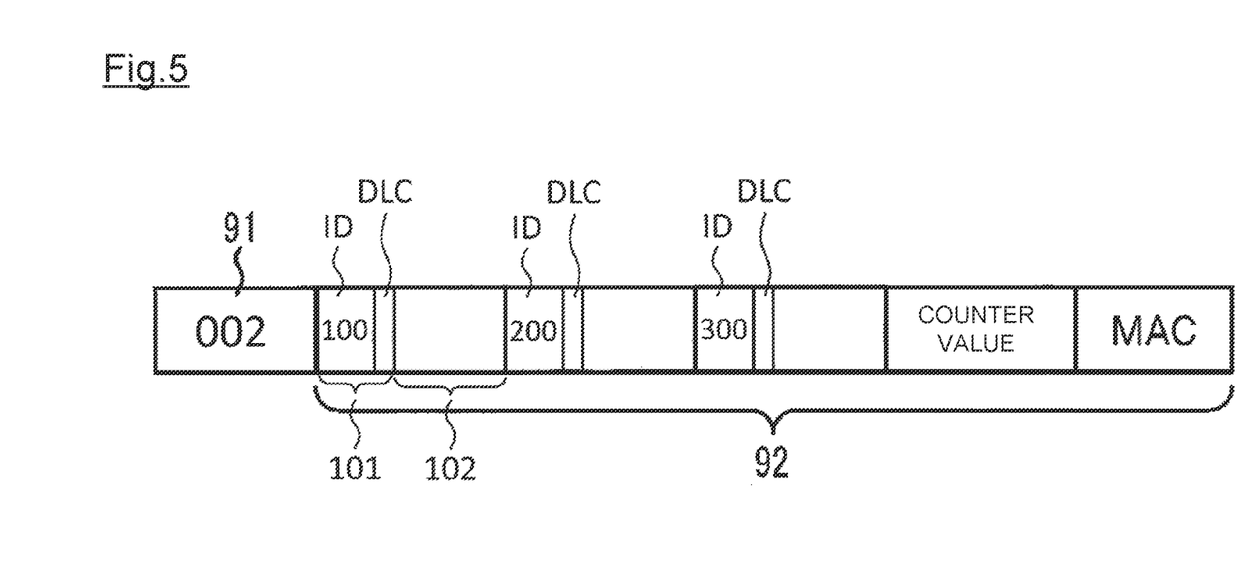
FIG. 5 is an explanatory diagram illustrating a structure of a CAN FD data frame.

FIG. 5 illustrates an example of the structure of a data frame generated by the frame generation unit 550. The data frame includes an ID field 91 storing a CAN FD ID and a data field 92 storing CAN frames. The data field 92 stores CAN frames, a counter value, and a MAC. FIG. 5 illustrates an example of an FD frame storing three CAN frames in the data field. Note that the frame structure illustrated in FIG. 5 represents a frame structure of a frame with an ID of "002" assigned and with a MAC added as a part of the data field, of the FD frames illustrated in FIG. 3. Note that the illustration of other fields such as EOF illustrated in FIG. 3 is omitted in FIG. 5.

The ID field 91 includes a CAN FD ID, a DLC, and so on. The DLC included in the ID field 91 indicates the data length of the data field 92, and indicates how many bytes of data are transmitted in the frame. The DLC is represented by one byte for each of CAN and CAN FD. The DLC setting range is 0 to 8 bytes for CAN, and 12, 16, 20, 24, 32, 48, or 64 bytes for CAN FD with 8 bits or more.

Note that the ID field 91 does not include information indicating the number of CAN frames included in the data field 92. Therefore, the number of CAN frames included in the data field 92 cannot be known only by the ID field 91.

The data field 92 includes a plurality of CAN frames, a counter value, and a MAC. In the example of FIG. 5, three CAN frames are stored in the data field 92. Each CAN frame includes an ID field 101 and a data field 102, and the ID field 101 includes a CAN ID and a DLC. To each of the IDs of the three CAN frames, "100", "200", and "300" are assigned, respectively, and in the order of "100", "200", and "300", the three CAN frames are stored in the data field 92. Further, in the data field 92, the counter value and the MAC are stored at positions behind the plurality of CAN frames. The counter value and the MAC are data used for verifying the validity of the data frame, and are also frame-specific data (unique data). Note that, since the data capacity of a CAN frame is limited to a maximum of 8 bytes, the data frame of the CAN frame cannot store all of the control information, the counter value, and the MAC. On the other hand, in an FD frame, the maximum data capacity is 64 bytes, so that the data frame of the FD frame can store a counter value and a MAC in addition to control information and a plurality of CAN frames.

The MAC verification unit 560 verifies the validity of the data frame, that is, whether the received data frame is from any one of the ECU 11 and the others, the DM 31 and the others, and the CGW 7 in the in-vehicle network system on the basis of the MAC of the data frame received by the communication unit 520. Specifically, the MAC verification unit 560 acquires the IDs, the control information, the counter value, and the MAC from the received data frame. The MAC verification unit 560 generates a MAC for verification with a common key 512 stored in the storage unit 510 on the basis of the acquired IDs, control information, and counter value.

Then, the MAC verification unit 560 compares the MAC acquired from the received data frame with the MAC for verification, and the MAC verification unit 560 determines that the received data frame is valid data if the acquired MAC and the MAC for verification match. When the MAC verification unit 560 determines that the received data frame is valid data, the MAC verification unit 560 outputs the received data frame to the counter value verification unit 570. Further, when the MAC verification unit 560 determines that the received data frame is invalid data, the MAC verification unit 560 discards the received data frame. In this way, since an invalid data frame can be detected by using the MAC and discarded, it is possible to prevent a replay attack or the like against the in-vehicle network system. Note that, although CAN ID(s), control information, and a counter value are used to generate a MAC, the MAC may be generated by using any one or a combination of two of these three pieces of data.

The counter value verification unit 570 acquires the counter value from the received data frame and determines whether or not the continuity of the counter value is maintained. When the counter value verification unit 570 determines that the continuity is not maintained, the counter value verification unit 570 discards the received data frame. Then, after the MAC verification unit 560 and the counter value verification unit 570 determine that the received data frame is valid data, the DM 51 processes the data included in the data frame. For example, when an FD frame including a plurality of CAN frames as illustrated in FIG. 5 is received, the DM 51 executes a frame recognition process for each CAN frame, and transmits the recognized CAN frame to each of the ECUs 52 to 54 under the CAN communication protocol.

When the communication unit 520 receives an FD frame storing at least one CAN frame, the frame recognition unit 580 recognizes the CAN frame in the data field of the FD frame. The CAN frame authentication identifies each frame stored in the data field 92.

Figure 6:
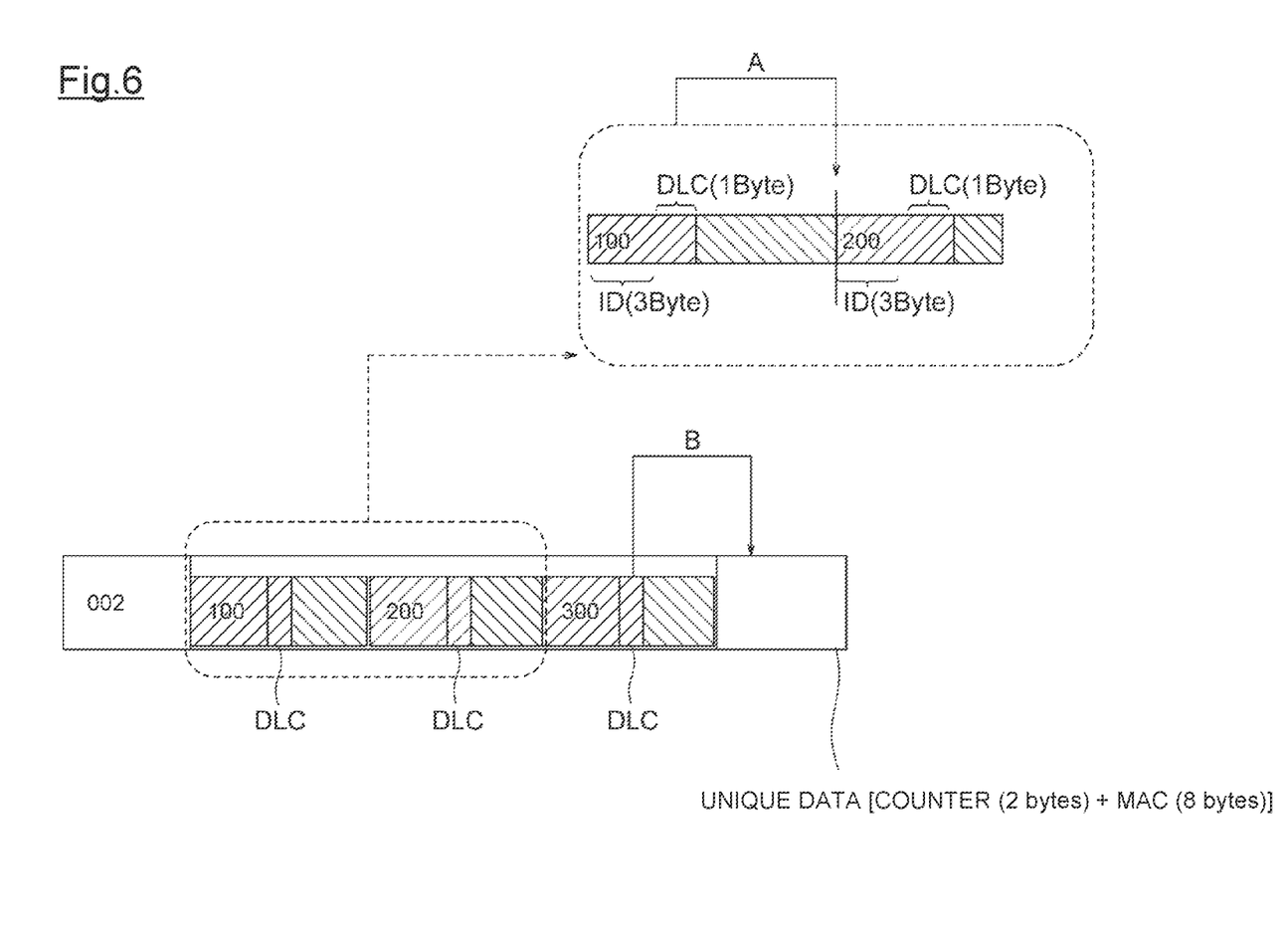
FIG. 6 is an explanatory diagram illustrating a structure of a CAN FD data frame.

A frame authentication process by the frame recognition unit 580 will be described with reference to FIG. 6. FIG. 6 illustrates an example of the structure of a CAN FD data frame, and is also a diagram for explaining the frame authentication. Note that the data frame of FIG. 6 is the same as the data frame of FIG. 5.

The frame recognition unit 580 recognizes that at least one CAN frame is stored in the data field by identifying the ID as "002" from the ID field 91. The frame recognition unit 580 reads the data from the beginning of the CAN frame and identifies the CAN ID and DLC included in the ID field. The frame recognition unit 580 can identify by the CAN ID that the CAN frame(s) are stored in the FD frame. In the example of FIG. 6, the frame recognition unit 580 identifies that the CAN frame with ID "100" assigned is stored, and the DLC stored in the ID field. The data length of the data field of the CAN frame can be set in the range of 0 to 8 bytes, but the frame recognition unit 580 can identifies the data length of the data field from the DLC. From the data length indicated by the DLC, the frame recognition unit 580 can identify the frame delimiter, which is the end of the CAN frame with ID "100" (see arrow A in FIG. 6). As a result, the frame recognition unit 580 can authenticate the CAN frame with ID "100" in the data field of the FD frame.

After identifying the delimiter of the CAN frame with ID "100", the frame recognition unit 580 reads the data stored behind the identified delimiter (data located following the frame delimiter in the data structure). In the example of FIG. 6, the frame recognition unit 580 reads the data behind the delimiter of the CAN frame with ID "10ne0", and identifies that the CAN frame with ID "200" assigned is stored, and the DLC stored in the ID field of the CAN frame with ID "200". Then, the frame recognition unit 580 authenticates the CAN frame with ID "200" by identifying the frame delimiter, which is the end of the CAN frame with ID "200", on the basis of the DLC in the same manner as the CAN frame with ID "100". Further, the frame recognition unit 580 authenticates the CAN frame with ID "300" by identifying the frame delimiter, which is the end of the CAN frame with ID "300", on the basis of the DLC in the same manner as the CAN frames with ID "100" and ID "200".

Next, the frame recognition unit 580 reads the data stored behind the delimiter of the CAN frame with ID "300". In the example of FIG. 6, no new CAN frame is stored behind the CAN frame with ID "300", but a counter value and a MAC are stored. Therefore, the frame recognition unit 580 reads the data at the position where the counter value and the MAC are stored, as indicated by arrow B in FIG. 6.

The data length of the CAN frame is set to any value within the range of 0 to 8 bytes, and in order to improve the data efficiency, the position of the CAN frame in the data field of the FD frame is not fixed and changes depending on the amount of data as appropriate. As described above, by using the DLC of the CAN frame, the frame recognition unit 580 can identify that a CAN ID follows the data having the data length indicated by the DLC. For example, if the DLC included in the CAN frame with ID "100" indicates 4 bytes, the frame recognition unit 580 can know the storage position of the ID (3 bytes) of the next CAN frame which is offset by the data length (4 bytes) of the payload of the CAN frame with ID "100".

However, if a counter value and/or a MAC is stored in the storage position of the ID of the next CAN frame, the counter value and/or the MAC may be erroneously recognized as another CAN frame. In other words, since both a counter value and a MAC can take any value instead of a unique value, the counter value or the MAC value may accidentally match the value of the ID for a CAN frame. Further, the amount of data for the counter value and the MAC is 10 bytes, which is larger than the amount of data for one frame of CAN. Therefore, if a CAN frame is stored at the storage position of the counter value or the MAC, the frame recognition unit 580 may fail to recognize.

In the present embodiment, in order to prevent such a frame from failing to be recognized, the frame recognition unit 580 recognizes a CAN frame without performing a frame recognition process on data in a storage area where unique data such as a counter value and/or a MAC is stored. The storage area for unique data such as a counter value and/or a MAC in the data field is predetermined as a storage area from the end of the data field of the FD frame to the position of the end of the predetermined data length (10 bytes in the example of FIG. 6). The data length of the storage area is set to be longer than the data length of the unique data. However, the positional relationship between the CAN FD ID and the storage area dynamically changes within the frame depending on the number of CAN frames included in the data field, the amount of data in the CAN frames, and the like. The frame recognition unit 580 can know the storage area for the unique data including the counter value and the MAC by identifying the end of the data field from the DLC of the FD frame. In the above frame authentication process, the frame recognition unit 580 does not perform a frame recognition process on the data in the storage area but performs a frame recognition process on the data in areas other than the storage area in the data field. In the example of FIG. 6, a frame recognition process is not performed on the data with the counter value and the MAC added at a position behind the CAN frame with ID "300". In other words, the frame recognition unit 580 ignores the data for 10 bytes (the data with the counter value and the MAC added) up to the end of the data field to perform the frame recognition process.

In the example of FIG. 6, after identifying the position of the storage area for the unique data in the data field, the frame recognition unit 580 performs the frame recognition process and thus recognizes the frames in the order of the CAN frame with ID "100", the CAN frame with ID "200", and the CAN frame with ID "300". Since the position of the ID indicated by the DLC of the CAN frame with ID "300" is within the storage area of the unique data, the frame recognition unit 580 identifies the CAN frame with ID "300" and then ends the frame recognition process. This makes it possible to recognize the CAN frames while preventing a frame from failing to be recognized.

Figure 7:
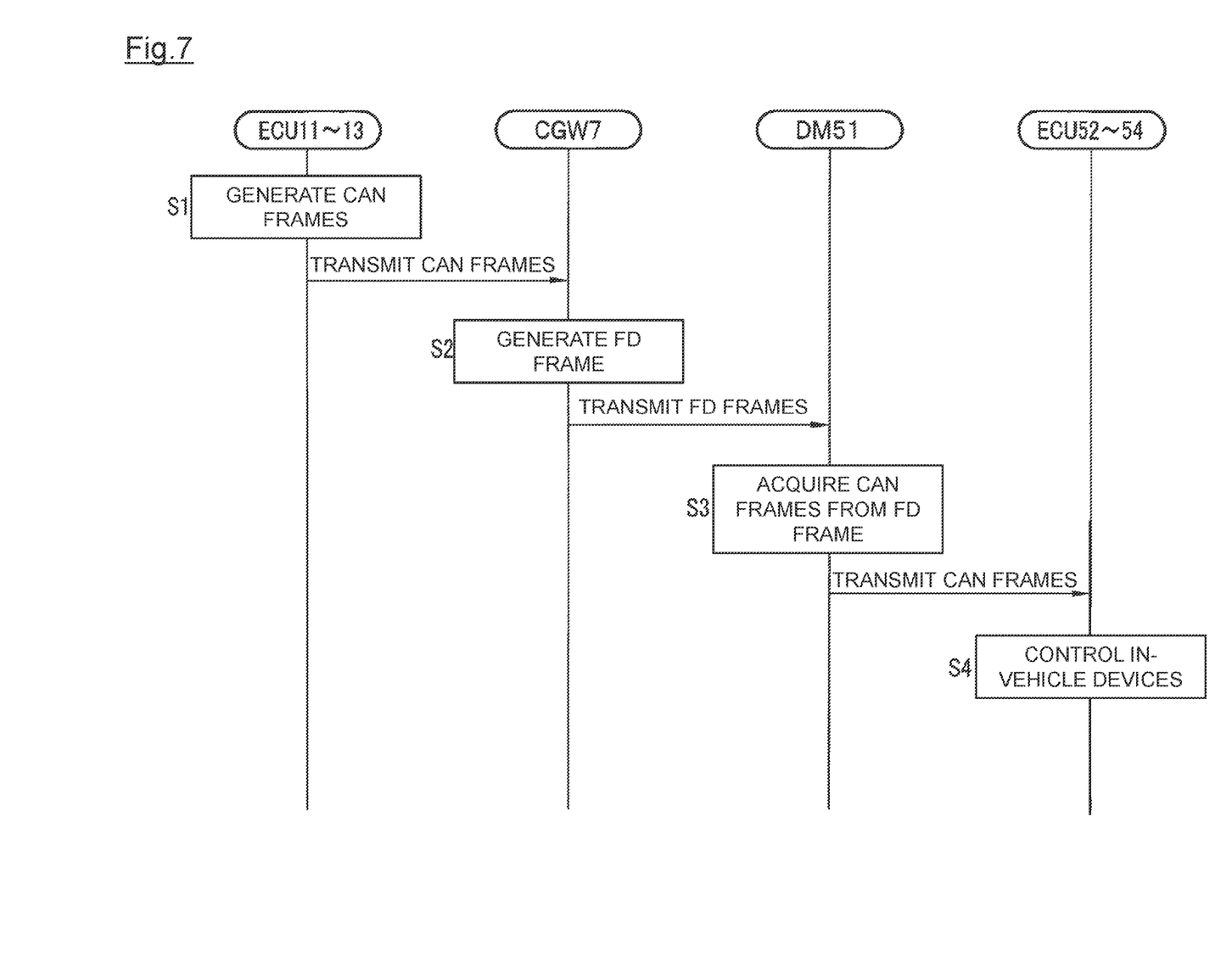
FIG. 7 is a sequence chart illustrating a procedure for transmitting a CAN frame from a communication network connected to a CAN bus to a communication network connected to a CAN bus.
Figure 8:
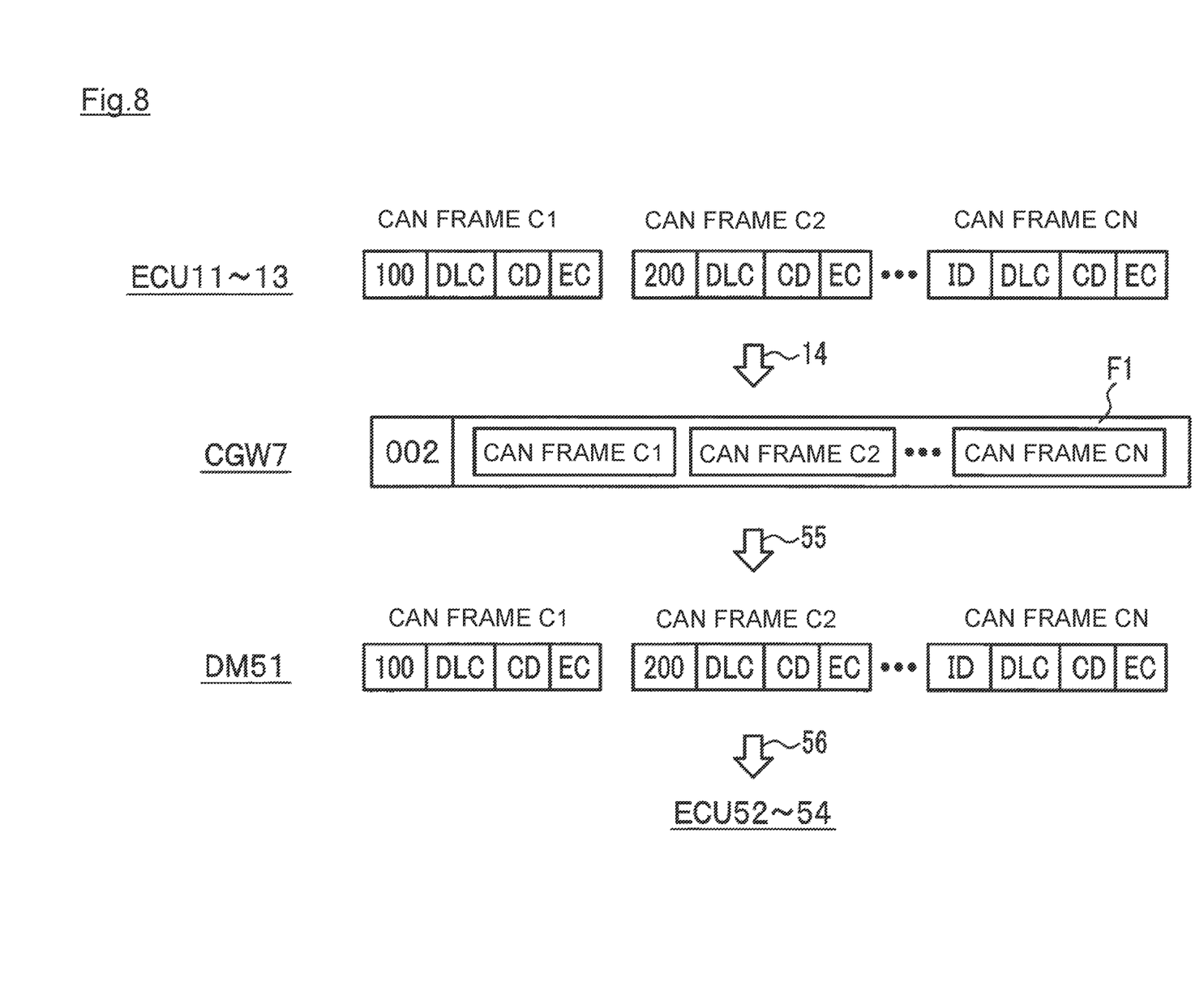
FIG. 8 is an explanatory diagram illustrating a procedure for transmitting a CAN frame from a communication network connected to a CAN bus to a communication network connected to a CAN bus.

Next, referring to the sequence chart of FIG. 7 and the explanatory diagram of FIG. 8, a procedure will be described in which the CAN frames generated by the ECUs 11 to 13 of the first communication network 1 are transmitted to the ECUs 52 to 54 of the fifth communication network 5. As illustrated in step S1 of FIG. 7, the ECUs 11 to 13 of the first communication network 1 acquire sensor information from the sensors, and generate, for example, CAN frames C1 to CN. Specifically, the ECUs 11 to 13 generate control information CD including the sensor information on the basis of the acquired sensor information, and set CAN IDs on the basis of the types of the sensor information and the like. In FIG. 8, "100" and "200" each indicate a CAN ID. The ECUs 11 to 13 store the control information CD in the data fields of the generated CAN frames C1 to CN, and transmit the generated CAN frames C1 to CN to the CGW 7 via the CAN bus 14.

The CGW 7 receives the CAN frames C1 to CN from the first communication network 1 via the CAN bus 14, and in step S2, generates an FD frame F1 whose data field storing the received CAN frames C1 to CN. Specifically, the CGW 7 assigns, to an FD frame F1, "002" as a CAN FD ID indicating that at least one CAN frame is stored in the data field. The CGW 7 also groups the CAN frames C1 to CN on the basis of the destination ECUs for the CAN frames C1 to CN, the type of the stored control information CD, the transmission cycle of the CAN frames C1 to CN, and the like, and generates an FD frame F1 for each of the groups of CAN frames. Further, the CGW 7 transmits the generated FD frames F1 to the DM 51 via the FD bus 55 of the fifth communication network 5.

The type of control information CD means that the control contents in which the control information CD is used are common or relevant. For example, in the case where the CAN frames C1 to CN are grouped according to the control of acceleration/deceleration of the vehicle, the control of the power train of the engine or the like and the control of the brake or the like have common or relevant control contents, and the CAN frames C1 to CN are grouped into the pieces of control information CD used for these controls. Further, the transmission cycle of the CAN frames C1 to CN means, for example, a transmission cycle for the case where the sensor information acquired from the sensor is transmitted at a predetermined time interval, and the CAN frames C1 to CN are grouped into the pieces of control information CD having the same or similar transmission cycle. Such transmission of the CAN frames C1 to CN grouped according to the destination ECUs, the types of control information CD, the transmission cycle, and the like makes it possible to reduce the transmission load of the in-vehicle communication network system CNW. Further, the related pieces of control information CD can be transmitted together, so that it is possible to perform the control by the destination ECUs appropriately and efficiently.

Further, the CGW 7 acquires only the "data field" from each of the CAN frames C1 to CN and stores them in the data field of the FD frame F1. "DLC" is used to determine the delimiter of the plurality of CAN frames C1 to CN stored in the data field. In this way, out of the large number of data constituting the CAN frames C1 to CN, only the data required by the destination ECU(s) is stored in the FD frame F1 and then transmitted, so that it is possible to reduce the transmission load of the in-vehicle communication network system CNW.

In response to receiving the FD frame F1 via the FD bus 55, the DM 51 of the fifth communication network 5 determines that at least one CAN frame is stored in the data field on the basis of the CAN FD ID. In step S3, the DM 51 acquires the CAN frames C1 to CN from the received FD frame F1. As described above, when the plurality of CAN frames C1 to CN are acquired from the data field of the FD frame F1 by the frame authentication, the delimiter between the CAN frames can be determined by using "DLC", so that it is possible to acquire the plurality of CAN frames C1 to CN appropriately. In addition, when the DM 51 recognizes the plurality of CAN frames C1 to CN in the FD frame F1 on the basis of the DLC the DM 51 does not perform the frame recognition process on the data in the storage area for the unique data including the counter value and the MAC. This makes it possible to acquire the plurality of CAN frames C1 to CN appropriately while preventing a frame from failing to be recognized. Then, the DM 51 transmits the acquired CAN frames C1 to CN to the CAN bus 56 of the fifth communication network 5.

The ECUs 52 to 54 of the fifth communication network 5 receives the CAN frames C1 to CN required for controlling the in-vehicle devices on the basis of the CAN IDs of CAN frames C1 to CN. Further, in step S4, the ECUs 52 to 54 control the in-vehicle devices on the basis of the received control signals CD of the CAN frames C1 to CN.

As described above, in the in-vehicle communication network system CNW according to the present embodiment, a FD frame has a CAN frame, a CAN ID, and unique data stored in a predetermined storage area at a position behind the CAN frame, and a relay such as the DMs 31 to 61 or the CGW 7 recognizes the CAN frame without performing a frame recognition process on the data in the storage area when performing a frame recognition process for recognizing the CAN frame in the FD frame on the basis of the data length of the payload of the CAN frame. This makes it possible to prevent the unique data stored in the storage area from being erroneously identified as a CAN ID and to prevent the CAN frame from failing to be recognized.

Further, in the in-vehicle communication network system CNW according to the present embodiment, the storage area for the unique data is set to an area from the end of the data field including the CAN frame and the unique data to the end of a predetermined data length. This makes it possible to prevent the CAN frame from failing to be recognized.

Further, in the in-vehicle communication network system CNW according to the present embodiment, the above-mentioned predetermined data length is set to be longer than the data length of the unique data. This makes it possible to exclude an area whose data value may match the CAN ID value from the area on which the frame authentication process is performed, and as a result, it is possible to prevent a CAN frame from failing to be recognized.

Further, in the in-vehicle communication network system CNW according to the present embodiment, the unique data is data indicating the validity of the data and can be set to any numerical value. This makes it possible to exclude data whose data value may match the CAN ID value from the target on which the frame authentication process is performed, and as a result, it is possible to prevent a CAN frame from failing to be recognized.

Note that, as a modification of the present embodiment, the DM 51 may insert padding data having a data length longer than the data length of the CAN ID into between a CAN frame and unique data in the process of storing the CAN frame in an FD frame. In the data structure of the FD frame illustrated in FIG. 6, padding data having a data length of 3 bytes or more is inserted into between the CAN frame with ID "300" and the unique data. The padding data is meaningless data. Note that padding data is typically inserted to treat data as having a fixed length, but in the modification, the padding data is fixed data always inserted. Therefore, if the total amount of data in which the padding data is inserted into between the CAN frame and the unique data in the data field exceeds a first fixed length predefined for the FD frame, the amount of data is adjusted by setting the padding data to have an increased data length or by storing another CAN frame so that the total amount of data in the data field becomes a second fixed length. Note that the first fixed length and the second fixed length indicate a fixed length defined for the data field of the FD frame, and the second fixed length is longer than the first fixed length. By doing so, in response to receiving an FD frame storing a CAN frame, when the CGW 7 performs the frame recognition process on the basis of the DLC of the CAN frame in the FD frame, the CGW 7 may not perform data processing of "recognizing the CAN frame without performing the frame recognition process on the data in the storage area". As a result, it is possible to prevent the CAN frame from failing to be recognized.

However, in the data processing as in the above modification, the data efficiency is lowered by the amount of inserting the padding data. Therefore, from the viewpoint of data efficiency, data processing of "recognizing the CAN frame without performing the frame recognition process on the data in the storage area" is preferable. Further, data of the number of stored CAN frames may be added to the CAN FD ID, but the amount of data of the CAN FD ID becomes large and the data efficiency is lowered. Therefore, from the viewpoint of data efficiency, data processing of "recognizing the CAN frame without performing the frame recognition process on the data in the storage area" is preferable.

DESCRIPTION OF REFERENCE NUMERALS

CNW In-vehicle communication network system
1 First communication network
11 to 13 ECU (Electronic Control Unit)
2 Second communication network
21 to 23 ECU
3 Third communication network
31 DM (Domain Master)
32 to 34 ECU
35, 36 FD bus
4 Fourth communication network
41 DM
42 to 44 ECU
45, 46 FD bus
5 Fifth communication network
51 DM
510 Storage unit
511 Counter value
512 Common key
520 Communication unit
530 Counter
540 Data acquisition unit
550 Frame generation unit
560 MAC verification unit
570 Counter value verification unit
580 Frame recognition unit
52 to 54 ECU
55 FD bus
56 CAN bus
6 Sixth communication network
61 DM
62 to 64 ECU
65 FD bus
66 CAN bus
7 CGW (Central Gateway)
C1 to CN CAN frame
F1 FD frame
E1 Ethernet frame

The invention claimed is:

1. A relay device comprising:
a relay connected between a first communication network and a second communication network, the second communication network using a communication protocol different from a communication protocol of the first communication network,
wherein the relay is configured to receive a CAN FD frame storing a CAN frame,
wherein the CAN frame is transmitted in the first communication network, and has a first payload including control information, a CAN ID for identifying the control information, and a data length code (DLC CAN) indicating a data length of the first payload,
wherein the CAN FD frame is transmitted in the second communication network, and has a ID field and a data field, the ID field including a CAN FD ID that indicates the CAN frame is included and a data length code (DLC FD) indicating a data length of the data field,
wherein the data field includes a plurality of the CAN frames and MAC,
wherein the MAC is stored in a storage area that is located at positions behind the plurality of CAN frames in the data field,
wherein the relay is further configured to
perform frame recognition process for recognizing the plurality of the CAN frames,
wherein the frame recognition process includes
recognizing that the CAN frame is stored by identifying the CAN FD ID in the ID field,
reading data of the CAN frame to identify the CAN ID and the DLC CAN,
identifying a frame delimiter of the plurality of the CAN frames from the DCL CAN, and
identifying the storage area including a counter value and the MAC by identifying the end of the data field from the DLC FD,
end the frame recognition process after identifying the last stored CAN frame out of the plurality of CAN frames,
acquire the MAC in the storage area,
compare the acquired MAC with a MAC for verification, and
determine that a received data frame is valid data if the acquired MAC and the MAC for verification match.
2. The relay device according to claim 1, wherein unique data is included in the storage area and is data indicating validity of data, and is able to be set to any numerical value.
3. A communication network system comprising:
a first electric control unit connected to a first communication network;
a second electric control unit connected to a second communication network, the second communication network using a communication protocol different from a communication protocol of the first communication network; and a relay device connected to the first communication network and the second communication network, the relay device being configured to receive a second frame storing at least one first frame, wherein the first frame is transmitted in the first communication network, and has a first payload including control information, a CAN ID for identifying the control information, and a data length code (DLC CAN) indicating a data length of the first payload, wherein the CAN FD frame is transmitted in the second communication network, and has an ID field and a data field, the ID field including a CAN FD ID that indicates the CAN frame is included and a data length code (DLC FD) indicating a data length of the data field, wherein the data field includes a plurality of the CAN frames and MAC, wherein the MAC is stored in a storage area that is located at positions behind the plurality of CAN frames in the data field, wherein the relay device is further configured to
  perform frame recognition process for recognizing the plurality of the CAN frames,
    wherein the frame recognition process includes
      recognizing that the CAN frame is stored by identifying the CAN FD ID in the ID field,
      reading data of the CAN frame to identify the CAN ID and the DLC CAN
      identifying a frame delimiter of the plurality of the CAN frames from the DCL CAN, and
      identifying the storage area including a counter value and the MAC by identifying the end of the data field from the DLC FD,
  end the frame recognition process after identifying the last stored CAN frame out of the plurality of CAN frames,
  acquire the MAC in the storage area,
  compare the acquired MAC with a MAC for verification, and
  determine that a received data frame is valid data if the acquired MAC and the MAC for verification match.

4. A communication control method to be executed by a relay device connected between a first communication network and a second communication network, the second communication network using a communication protocol different from a communication protocol of the first communication network, the method comprising:
  receiving a CAN FD from the second communication network, the CAN FD having an ID field and a data field, the ID field including a CAN FD ID that indicates the CAN frame is included and a data length code (DLC FD) indicating a data length of the data field, the data field including a plurality of the CAN frames and MAC, the MAC stored in a storage area that is located at positions behind the plurality of CAN frames in the data field;
  performing frame recognition process for recognizing the plurality of CAN frames, the CAN frames transmitted in the first communication network, and each of the CAN frames having a first payload including control information, a CAN ID for identifying the control information, and a data length code (DLC CAN) indicating a data length of the first payload,
    wherein the frame recognition process includes
      recognizing that the CAN frame is stored by identifying the CAN FD ID in the ID field,
      reading data of the CAN frame to identify the CAN ID and the DLC CAN,
      identifying a frame delimiter of the plurality of the CAN frames from the DCL CAN, and
      identifying the storage area including a counter value and the MAC by identifying the end of the data field from the DLC FD;
  ending the frame recognition process after identifying the last stored CAN frame out of the plurality of CAN frames;
  acquiring the MAC in the storage area;
  comparing the acquired MAC with a MAC for verification;
  determining that a received data frame is valid data if the acquired MAC and the MAC for verification match; and
  transmitting the recognized first frame to the first communication network.

* * * * *